(12) United States Patent
Van Der Valk et al.

(10) Patent No.: US 7,356,036 B2
(45) Date of Patent: Apr. 8, 2008

(54) METHOD PROVIDING DISTRIBUTION MEANS FOR REFERENCE CLOCKS ACROSS PACKETIZED NETWORKS

(75) Inventors: Robertus Laurentius Van Der Valk, Capelle a/d IJssel (NL); Willem L. Repko, Hilversum (NL)

(73) Assignee: Zarlink Semiconductor Inc., Ontario (CA)

( * ) Notice: Subject to any disclaimer, the term of this patent is extended or adjusted under 35 U.S.C. 154(b) by 830 days.

(21) Appl. No.: 10/781,165

(22) Filed: Feb. 18, 2004

(65) Prior Publication Data
US 2004/0264478 A1 Dec. 30, 2004

Related U.S. Application Data

(60) Provisional application No. 60/448,738, filed on Feb. 20, 2003.

(51) Int. Cl.
*H04L 12/28* (2006.01)
*H04L 7/00* (2006.01)
*H04J 3/06* (2006.01)
*G06F 1/12* (2006.01)

(52) U.S. Cl. ............... 370/395.62; 370/509; 375/356; 713/375

(58) Field of Classification Search ............... 370/350, 370/395.62, 503–520; 375/354, 356, 371, 375/373; 713/375, 400
See application file for complete search history.

(56) References Cited

U.S. PATENT DOCUMENTS

| 4,815,110 A | * | 3/1989 | Benson et al. ............... 375/356 |
| 5,566,180 A | | 10/1996 | Eidson et al. |
| 5,638,379 A | | 6/1997 | Narasimha et al. |
| 5,666,330 A | * | 9/1997 | Zampetti ............... 368/47 |
| 6,128,318 A | | 10/2000 | Sato |

(Continued)

FOREIGN PATENT DOCUMENTS

JP 2000332802 11/2000

(Continued)

OTHER PUBLICATIONS

Oscilloquartz S.A.; "Multi-site PRC Systems"; Application Note; Oct. 17, 1997; pp. 1-11; No. 01-96; Neuchatel, Switzerland.

*Primary Examiner*—Wing Chan
*Assistant Examiner*—Hong Sol Cho
(74) *Attorney, Agent, or Firm*—Lawrence E. Laubscher, Jr.

(57) ABSTRACT

Disclosed is a method of distributing a number of reference clocks across a packet network. The packet network has a master node and one or more slave nodes, the master node and each slave node having basis clocks. A sender sends time-stamped synchronization packets to said one or more slave nodes, and a receiver at the slave nodes receives the time-stamped synchronization packets and synchronizes the basis clocks in the slave nodes with the basis clock in the master node. Multiple reference clocks are encoded with respect to the basis clock in the master node to generate numerical information describing the reference clock(s) in relation to the basis clock in the master node. The basis clock in each of the slave node is synchronized to the basis clock in the master node using time-stamped synchronization packets. The one or more reference clocks are recovered at the slave nodes using said numerical information describing the reference clock(s) in relation to the basis clock in the master node.

10 Claims, 2 Drawing Sheets

U.S. PATENT DOCUMENTS

| | | |
|---|---|---|
| 6,252,445 B1 | 6/2001 | Eidson |
| 6,370,159 B1* | 4/2002 | Eidson .................. 370/503 |
| 6,665,316 B1* | 12/2003 | Eidson .................. 370/509 |
| 6,944,188 B2* | 9/2005 | Sinha et al. ............. 370/503 |
| 7,050,420 B2* | 5/2006 | Findikli .................. 370/350 |
| 2001/0000071 A1* | 3/2001 | Nichols .................. 370/395 |
| 2002/0136232 A1* | 9/2002 | Dudziak et al. .......... 370/445 |
| 2002/0163622 A1 | 11/2002 | Magnin et al. |
| 2002/0186716 A1* | 12/2002 | Eidson .................. 370/503 |
| 2003/0185238 A1* | 10/2003 | Strasser et al. ........... 370/473 |
| 2004/0032883 A1* | 2/2004 | Knapp et al. ............ 370/509 |
| 2007/0002987 A1* | 1/2007 | Sinha et al. ............. 375/354 |
| 2007/0047592 A1* | 3/2007 | Jorgenson et al. ........ 370/509 |

FOREIGN PATENT DOCUMENTS

| | | |
|---|---|---|
| JP | 2001186180 | 7/2001 |
| JP | 2002111645 | 4/2002 |

* cited by examiner

METHOD PROVIDING DISTRIBUTION MEANS FOR REFERENCE CLOCKS ACROSS PACKETIZED NETWORKS

CROSS-REFERENCE TO RELATED APPLICATION

This application claims the benefit under 35 U.S.C. 119(e) of U.S. Provisional Application No. 60/448,738 filed Feb. 20, 2003, the contents of which are incorporated by reference herein.

FIELD OF THE INVENTION

The present invention relates to the field of digital communications. More specifically, the present invention relates to a method of distributing fine-grained clocks across packet networks.

BACKGROUND OF THE INVENTION

There is increasing interest in providing telecommunications services over packet networks that were formerly provided over TDM (time division multiplexed) networks. Most of these telecommunications services require a synchronized clock, which is not provided by the physical layer of a packet network in the same way as it was provided by the physical layer of the TDM network. Various approaches to synchronization over packet networks have been proposed and standardized (see NTP and IEEE Std 1588, among others), but these methods usually distribute a single time-of-day reference. This is not a good match for some services which formerly ran over plesiochronous TDM network connections, where each connection was allowed a certain frequency inaccuracy, hence multiple connections entailed multiple reference clocks. For the sake of backwards compatibility, it is desirable for this possibility of multiple reference clocks to be supported over packet networks. A brute-force approach to this issue is to use adaptive clock recovery, which tries to average out packet rates to calculate the bit clock. Adaptive clock recovery tends to have poor wander performance, even when timestamping and packet sequence numbering are used to overcome packet-loss issues.

SUMMARY OF THE INVENTION

Disclosed is a method to distribute a number of reference clocks across a packet network. The described method uses a single "basis clock" per node; this basis clock is synchronized in each of the slave nodes to a master node. The master node also numerically encodes a number of reference clocks with respect to the master's basis clock. At each slave node, with the slave node's basis clock synchronized to the master basis clock, and with numerical information describing the reference clock(s) with regard to the master's basis clock, the reference clock(s) can be reconstructed with high accuracy.

Thus, according to one aspect, the invention provides a method of distributing a number of reference clocks across a packet network. The method comprises providing a basis clock in a master node and one or more slave nodes, encoding multiple reference clocks with respect to the basis clock in the master node to generate numerical information describing the reference clock(s) in relation to the basis clock in the master node, synchronizing the basis clock in each of the slave nodes to the basis clock in the master node using time-stamped synchronization packets, and recovering said one or more reference clocks at the slave nodes using said numerical information describing the reference clock(s) in relation to the basis clock in the master node.

In another aspect, the invention provides a packet network comprising a master node and one or more slave nodes, said master node and said slave nodes having basis clocks, means for numerically encoding a plurality of reference clocks with respect to the basis clock in the master node to generate numerical information describing the reference clock(s) with regard to the master's basis clock, a sender for sending time-stamped synchronization packets to said one or more slave nodes, a receiver at the slave nodes for receiving said time-stamped synchronization packets and synchronizing the basis clocks in the slave nodes with the basis clock in the master node, and means at the slave nodes for recovering said reference clocks using said numerical information describing the reference clock(s) with regard to the master's basis clock.

There are many advantages in using the disclosed method. The method works on existing networks without proprietary modifications to the hubs, switches and routers. It is possible to efficiently encode multiple reference clocks with the possibility of using minimum bandwidth per reference clock. In addition, it offers better wander performance than Adaptive Clock Recovery methods, when multiple reference clocks are present. Such a situation may arise when a number of T1 or E1 lines come into the source node, each having its own primary reference clock.

Other aspects and advantages of embodiments of the invention will be readily apparent to those ordinarily skilled in the art upon a review of the following description.

BRIEF DESCRIPTION OF THE DRAWINGS

Embodiments of the invention will now be described in conjunction with the accompanying drawings, wherein.

This invention will now be described in detail with respect to certain specific representative embodiments thereof, the materials, apparatus and process steps being understood as examples that are intended to be illustrative only. In particular, the invention is not intended to be limited to the methods, materials, conditions, process parameters, apparatus and the like specifically recited herein.

DETAILED DESCRIPTION OF THE PREFERRED EMBODIMENTS

Figure 1:
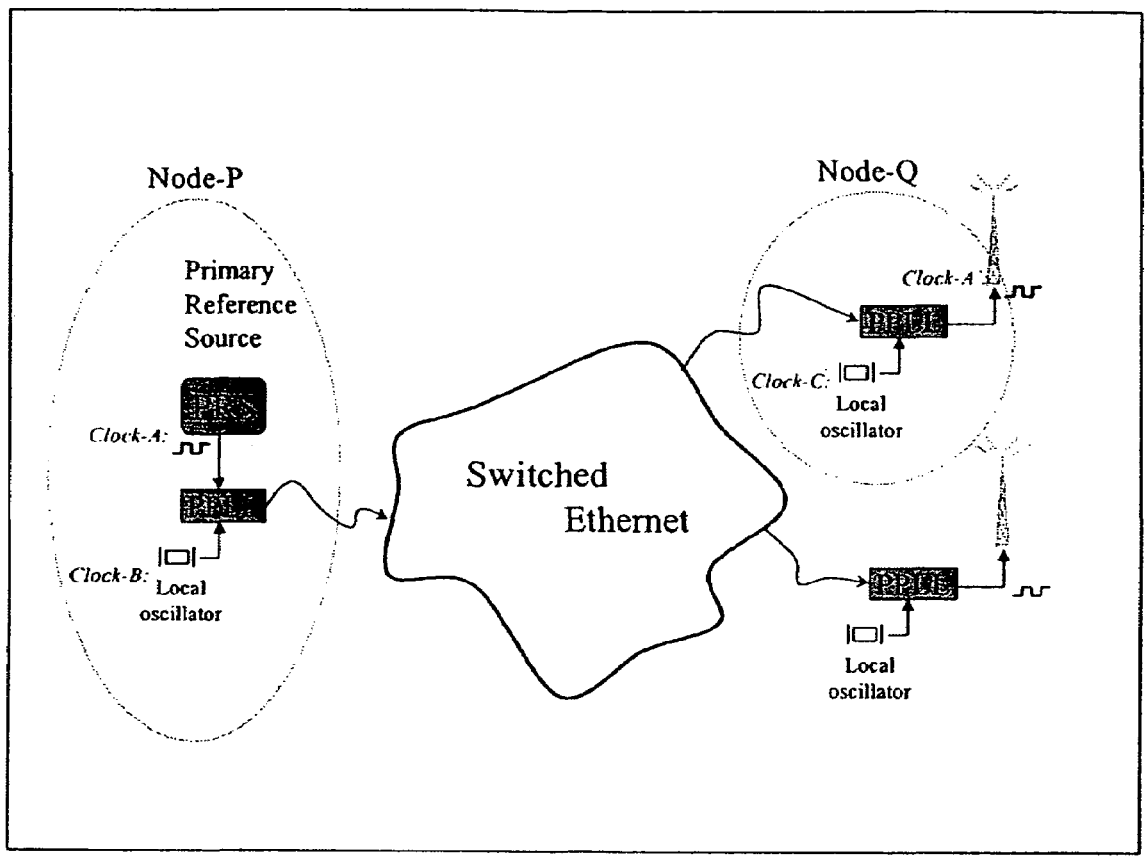
FIG. 1 illustrates a global picture of clocks distributed in the network.

FIG. 1 shows a simple configuration with two slave nodes and a single reference clock. The local oscillator which is the basis clock for slave node Q is characterized against the local oscillator which is the basis clock for master node P. These local oscillators offer one place to perform a cost/benefit tradeoff—better, more expensive oscillators provide better performance.

FIG. 1 shows one reference clock "Clock A". A series of alignment calculations is performed.

Alignment 1: Reference Clock Versus Master DCO

The DCO in the PPLL block at the master node will be locked to the incoming reference Clock A in a standard manner for digital PLLs: A PI-controller will lock the master DCO (acquisition PLL) to the reference clock.

Alignment 2: Master DCO Versus Master Local Time

Figure 2:
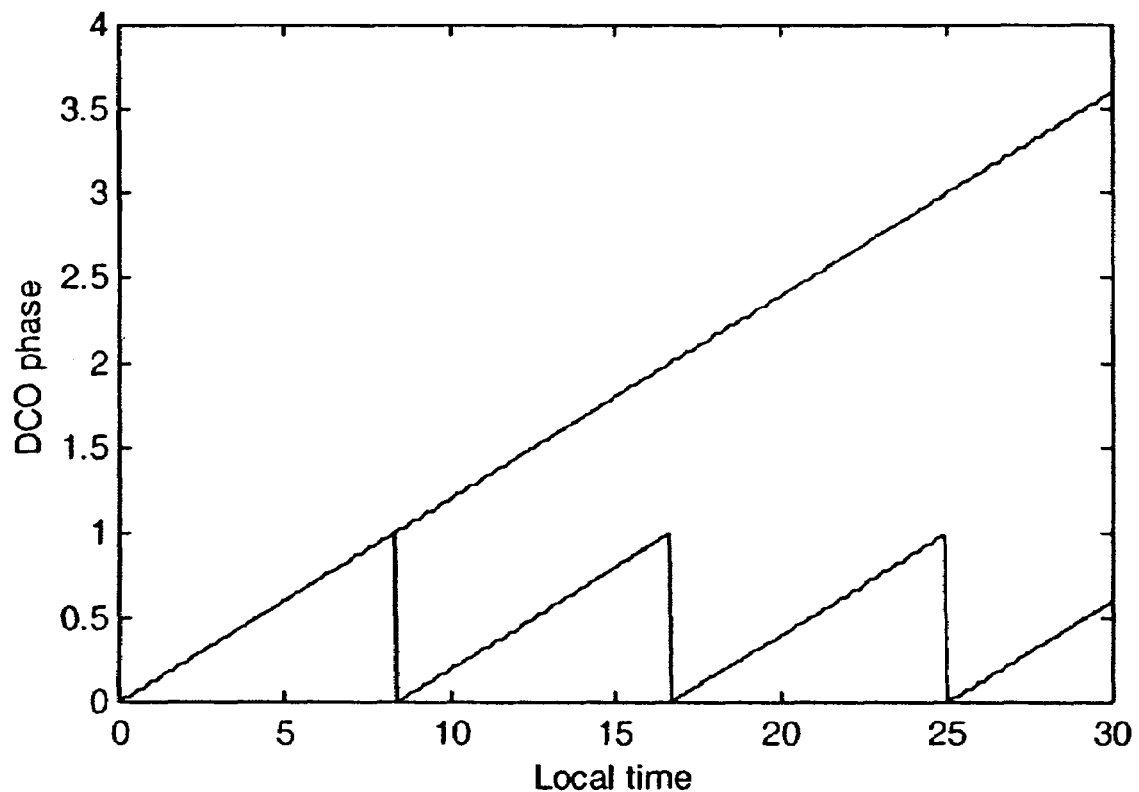
FIG. 2 illustrates the master DCO versus master local time.

The DCO ramp of the master describes a saw tooth as a function of its local time and represents unambiguously both phase and frequency of the reference clock (FIG. 2).

In the P-PLL the DCO phase will be extended with sufficient leading bits to prevent wrapping of the DCO phase too frequently for the software (dotted line). So at the master the local software samples the dotted line. This line is described with the simple equation:

$$\varphi DCO_M = m_0 + m_1 \cdot t_M \quad (1)$$

The software at the master will continuously determine the constants $M_{0,1}$ by sufficient sampling and curve fitting. MO indicates the absolute phase of the DCO at local time $t_M=0$. MI indicates the frequency of the DCO measured relative to the basis clock (local time) of the Master. The two M-constants are unambiguously describing the relationship between the local oscillator basis clock (local time) at the master and the ramp of the master DCO that is locked to the reference clock. These constants are pair-wise transmitted to the slave nodes. The reference clock is thus numerically encoded with respect to the master basis clock.

Alignment 3: Local Time of the Master Versus Local Time of the Slave

The local time of the master and the slave are unrelated and will thus have a slight mutual frequency offset. This creates time scales drifting relative to each other. When the oscillators are reasonable steady this drift will not change much. Using broadcasting methods (referenced as broadcast events) or NTP-like protocols, the alignment between the master basis clock and the slave basis clock (the two local time domains) are described with:

$$t_M = C_0 + C_1 \cdot t_S \quad (2)$$

These constants are determined by curve fitting at the slave. They unambiguously describe the relationship between master basis clock (local master time) and slave basis clock (local slave time). Any event (e.g. clock edges) at the master can now be translated to the same real time at the slave using above equation.

Alignment 4: Local time of the slave versus the slave DCO

By sending the master's M-constants to the slave, the slave can reconstruct master DCO ramp exactly at the slave by substituting the second equation below:

$$\varphi_{DCO_M} = m_0 + m_1 \cdot t_M \quad (3)$$
$$\Leftrightarrow$$
$$\varphi_{DCO_M} = \varphi_{DCO_S} = m_0 + m_1 \cdot (c_0 + c_1 \cdot t_S) \quad (4)$$

The result is that all individual 4 alignments are unambiguously aligned, which means that the phase of the Master and the Slave clock are aligned (locked) too.

It can be seen by extension that if multiple acquisition DCOs are provided at the master, then multiple reference clocks can be encoded. The cost of each reference clock is the packet traffic to transport the M-constants pair for that reference clock. The rate at which the M-constants pair should be transmitted is related to the stability of the basis clock, and to the low speed variation of the reference clock with respect to the basis clock.

There are a number of variations possible within the scope of the disclosed invention. The packet network can be Ethernet (over various physical layer speeds; 10 Mbps, 100 Mbps, 1 Gbps, etc.), a wireless packet network such as 802.11, ATM, Frame relay, or any other standard or proprietary packet network. The Packet Network may or may not contain mechanisms for priority and Quality of Service/Class of Service.

The basis clock can be ovenized crystal oscillator, temperature compensated crystal oscillator, a real-time (time and date) clock, or any other oscillator with accuracy and stability suiting the application.

The slave basis clock can be synchronized to, or measured against, the master basis clock via NTP (Network Time Protocol), SNTP (Simple Network Time Protocol), PTP (Precise Time Protocol), a timing pulse on the extra Ethernet pair, or any other standard or proprietary methods.

Transmission of packets containing reference clock information can happen at regular preset intervals, chosen to minimize packet network loading while still providing sufficient bandwidth to track low speed variations in the reference clock, at pseudo-random intervals chosen to avoid any possible repetitious pattern of other packet network trait by "noise-shaping" the transmissions, or at auto-configurable intervals based on information gathered at the acquisition DPLL about the low speed variations in the reference clock.

Numerous modifications may be made without departing from the spirit and scope of the invention as defined in the appended claims.

What is claimed is:

1. A method of distributing a number of reference clocks across a packet network, comprising:
   providing a basis clock in a master node and one or more slave nodes;
   encoding multiple reference clocks with respect to the basis clock in the master node to generate numerical information describing the reference clocks in relation to the basis clock in the master node;
   synchronizing the basis clock in each of the slave nodes to the basis clock in the master node using time-stamped synchronization packets; and
   recovering at least one of said reference clocks at the slave nodes using said numerical information describing the reference clocks in relation to the basis clock in the master node.

2. A method as claimed in claim 1, wherein each slave basis clock is synchronized to the master basis clock.

3. A method as claimed in claim 2, wherein each slave basis clock is synchronized to the master basis clock using PLL.

4. A method as claimed in claim 1, wherein the reference clocks are encoded within packets.

5. A method as claimed in claim 4, wherein the packets containing encoded reference clocks are transmitted at regular intervals.

6. A packet network comprising:
   a master node and one or more slave nodes, said master node and said slave nodes having basis clocks;
   means for numerically encoding a plurality of reference clocks with respect to the basis clock in the master node to generate numerical information describing the reference clocks with regard to the master's basis clock;
   a sender for sending time-stamped synchronization packets to said one or more slave nodes;
   a receiver at the slave nodes for receiving said time-stamped synchronization packets and synchronizing the basis clocks in the slave nodes with the basis clock in the master node; and means at the slave nodes for recovering said reference clocks using said numerical information describing the reference clocks with regard to the master's basis clock.

7. A packet network as claimed in claim 6, wherein each slave basis clock is synchronized to the master basis clock.

8. A packet network as claimed in claim 7, wherein each slave basis clock is synchronized to the master basis clock using PLL.

9. A packet network as claimed in claim 6, wherein the reference clocks are encoded within packets.

10. A packet network as claimed in claim 9, wherein the packets containing encoded reference clocks are transmitted at regular intervals.

* * * * *